United States Patent
Oya et al.

(10) Patent No.: US 11,946,119 B2
(45) Date of Patent: Apr. 2, 2024

(54) POWDER MIXTURE FOR POWDER METALLURGY AND METHOD FOR PRODUCING POWDER MIXTURE FOR POWDER METALLURGY

(71) Applicant: JFE STEEL CORPORATION, Tokyo (JP)

(72) Inventors: Masato Oya, Tokyo (JP); Shigeru Unami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 736 days.

(21) Appl. No.: 17/059,210

(22) PCT Filed: Apr. 22, 2019

(86) PCT No.: PCT/JP2019/017090
§ 371 (c)(1),
(2) Date: Nov. 26, 2020

(87) PCT Pub. No.: WO2019/230259
PCT Pub. Date: Dec. 5, 2019

(65) Prior Publication Data
US 2021/0197258 A1 Jul. 1, 2021

(30) Foreign Application Priority Data
May 28, 2018 (JP) .................. 2018-101855

(51) Int. Cl.
| | |
|---|---|
| C08K 3/04 | (2006.01) |
| B22F 1/05 | (2022.01) |
| B22F 1/052 | (2022.01) |
| B22F 1/10 | (2022.01) |
| B22F 1/102 | (2022.01) |
| B22F 1/103 | (2022.01) |
| B22F 1/16 | (2022.01) |
| B22F 1/17 | (2022.01) |
| B22F 3/08 | (2006.01) |
| C08K 3/08 | (2006.01) |
| C22C 33/02 | (2006.01) |

(52) U.S. Cl.
CPC ............ *C22C 33/0264* (2013.01); *B22F 1/05* (2022.01); *B22F 1/052* (2022.01); *B22F 1/10* (2022.01); *B22F 1/102* (2022.01); *B22F 1/103* (2022.01); *B22F 1/108* (2022.01); *B22F 1/16* (2022.01); *B22F 1/17* (2022.01); *C08K 3/04* (2013.01); *C08K 3/08* (2013.01); *B22F 2301/10* (2013.01); *B22F 2302/40* (2013.01); *B22F 2302/45* (2013.01); *B22F 2304/10* (2013.01); *C08K 2003/085* (2013.01); *C08K 2003/0856* (2013.01); *C08K 2201/005* (2013.01)

(58) Field of Classification Search
CPC .......... C22C 33/0264; B22F 1/16; B22F 1/05; B22F 1/108; B22F 1/103; B22F 1/17; B22F 1/10; B22F 1/052; B22F 1/102; B22F 2301/10; B22F 2302/40; B22F 2302/45; B22F 2304/10; C08K 3/04; C08K 3/08; C08K 2003/085; C08K 2003/0856; C08K 2201/005
USPC ........................................................ 524/440
See application file for complete search history.

(56) References Cited

U.S. PATENT DOCUMENTS

| | | |
|---|---|---|
| 5,480,469 A | 1/1996 | Storstrom et al. |
| 5,627,258 A | 5/1997 | Takayama et al. |
| 7,390,345 B2 | 6/2008 | Solimnjad |
| 7,867,314 B2 | 1/2011 | Ono et al. |
| 9,352,393 B2 | 5/2016 | Ono et al. |
| 2006/0000310 A1 | 1/2006 | Solimnjad |
| 2009/0250666 A1 | 10/2009 | Saga |
| 2015/0134372 A1* | 5/2015 | Lopez Ruiz ....... G06Q 30/0623 705/5 |
| 2015/0151361 A1* | 6/2015 | Suzuki ................. B22F 1/10 241/30 |

(Continued)

FOREIGN PATENT DOCUMENTS

| | | |
|---|---|---|
| CN | 101890496 A | 11/2010 |
| CN | 105537580 A | 5/2016 |

(Continued)

OTHER PUBLICATIONS

May 26, 2020, Notification of Reasons for Refusal issued by the Japan Patent Office in the corresponding Japanese Patent Application No. 2019-530221 with English language Concise Statement of Relevance.

(Continued)

*Primary Examiner* — Kelechi C Egwim
(74) *Attorney, Agent, or Firm* — KENJA IP LAW PC

(57) ABSTRACT

Provided is a powder mixture for powder metallurgy that has excellent fluidity, can be ejected from a green compacting die with little force, and can suppress die galling in forming. The powder mixture comprises: a raw material powder; a copper powder; a binder; a graphite powder; and carbon black. The raw material powder contains an iron-based powder in an amount of 90 mass % or more with respect to the raw material powder. An average particle size of the graphite powder is less than 5 μm. Additive amounts of the binder, the graphite powder, the copper powder, and the carbon black are in specific ranges. A surface of the raw material powder is coated with at least part of the binder. A surface of the binder is coated with at least part of the graphite powder, at least part of the copper powder, and at least part of the carbon black.

4 Claims, No Drawings

(56) References Cited

U.S. PATENT DOCUMENTS

2015/0314372 A1\* 11/2015 Ono .................. B22F 1/102
428/403

FOREIGN PATENT DOCUMENTS

| CN | 107321973 A | \* | 11/2017 | ............ B22F 1/0059 |
|----|----|----|----|----|
| CN | 107321973 A | | 11/2017 | |
| EP | 2684628 A1 | | 1/2014 | |
| EP | 3756790 A1 | | 12/2020 | |
| JP | H07305101 A | | 11/1995 | |
| JP | 2005330547 A | \* | 12/2005 | |
| JP | 2005330547 A | | 12/2005 | |
| JP | 2010053437 A | | 3/2010 | |
| JP | 2010280990 A | | 12/2010 | |
| JP | 2018070903 A | | 5/2018 | |
| KR | 1020150093243 A | | 8/2015 | |
| WO | 2011051293 A1 | | 5/2011 | |
| WO | 2014103287 A1 | | 7/2014 | |

OTHER PUBLICATIONS

May 28, 2019, International Search Report issued in the International Patent Application No. PCT/JP2019/017090.

Jan. 19, 2023, Office Action issued by the China National Intellectual Property Administration in the corresponding Chinese Patent Application No. 201980034999.2 with English language search report.

Jul. 27, 2021, Office Action issued by the Korean Intellectual Property Office in the corresponding Korean Patent Application No. 10-2020-7034173 with English language concise statement of relevance.

May 30, 2022, Office Action issued by the China National Intellectual Property Administration in the corresponding Chinese Patent Application No. 201980034999.2 with English language search report.

Peng Zhihan, Polyamide, Dec. 2001, pp. 625-629.

Yan Kelu, Dyeing and finishing technology course, vol. 1, Sep. 2005, pp. 461-463.

Zhu Junhan, Laboratory Practical Handbook, Oct. 1994, pp. 146-152.

Jul. 5, 2021, the Extended European Search Report issued by the European Patent Office in the corresponding European Patent Application No. 19812433.1.

P. Bowen, Particle Size Distribution Measurement from Millimeters to Nanometers and from Rods to Platelets, Journal of Dispersion Science and Technology, 2002, pp. 631-662, vol. 23, No. 5.

\* cited by examiner

POWDER MIXTURE FOR POWDER METALLURGY AND METHOD FOR PRODUCING POWDER MIXTURE FOR POWDER METALLURGY

TECHNICAL FIELD

The present disclosure relates to a powder mixture for powder metallurgy and particularly relates to a powder mixture for powder metallurgy that can be ejected from a die with little force in forming and can suppress die galling. The present disclosure also relates to a method for producing the powder mixture for powder metallurgy.

BACKGROUND

In powder metallurgy, a raw material powder containing an iron-based powder as a main component is formed into a formed part (green compact) using a die, and the formed part is sintered to produce a sintered part. For good formability in the forming, techniques such as addition of a lubricant to the raw material powder and adhesion of a lubricant to the surface of the die used for the forming are commonly used. If a lubricant is not used, the iron-based powder contained in the raw material powder and the die come into direct contact with each other, as a result of which the frictional force increases. This leads to problems such as failing to compress the powder to desired compressed density in the forming and requiring great force when ejecting the formed part from the die after the forming.

For these reasons, various lubricants are used in powder metallurgy. Examples of the lubricants used include metal soaps such as lithium stearate and zinc stearate, and amide-based lubricants such as ethylene-bis-stearamide.

JP 2005-330547 A (PTL 1) proposes the use of graphite powder for lubricity improvement. By coating the surface of an iron-based powder with graphite, the lubricity of the surface of the iron-based powder is improved. Moreover, direct contact between the iron-based powder and the die is avoided because graphite is interposed therebetween, so that die galling is prevented.

CITATION LIST

Patent Literature

PTL 1: JP 2005-330547 A

SUMMARY

Technical Problem

As proposed in PTL 1, by using the iron-based powder coated with the graphite powder, friction in the forming can be reduced, and the force of ejection from the die can be reduced. However, the technique proposed in PTL 1 has the following problems.

With the technique proposed in PTL 1, a dispersion liquid obtained by dispersing graphite and a binder in water or an organic solvent is used to coat the surface of the iron-based powder with the graphite powder. This requires a production line capable of handling raw material in a liquid state. In particular, a device for recovering and treating a used solvent is needed.

Moreover, with the technique proposed in PTL 1, the binder is used to cause the graphite powder to adhere to the iron-based powder. A study on a powder mixture obtained by the method revealed that the binder is also present on the surface of the graphite powder adhering to the iron-based powder. The presence of the binder on the surface of the powder makes it impossible to improve the fluidity of the powder mixture sufficiently.

Furthermore, the study on the powder mixture obtained by the method revealed that a copper powder does not sufficiently adhere to the iron-based powder. When the copper powder does not sufficiently adhere to the iron-based powder, the copper powder segregates during transportation, filling, or forming, which causes unstable dimensional accuracy after sintering.

It could, therefore, be helpful to provide a powder mixture for powder metallurgy that has excellent fluidity, can be ejected from a green compacting die with little force, can suppress die galling in forming, and can prevent segregation of copper powder. It could also be helpful to provide a method for producing the powder mixture for powder metallurgy without using a solvent.

Solution to Problem

As a result of close examination, we discovered the following:

(1) In the case where a raw material powder, a graphite powder, and a binder are mixed simultaneously, the surface of the graphite powder is also coated with the binder, so that the outermost surface of the raw material powder cannot be sufficiently coated with the graphite powder.

(2) By causing a copper powder to adhere to the surface of the raw material powder using the binder and then coating it with fine graphite powder, the surfaces of the graphite powder and the copper powder can be prevented from being coated with the binder. As a result of the particle surfaces being coated with graphite, ejection from a die in forming can be performed with little force, and die galling can be suppressed.

(3) By coating the particle surfaces with the graphite powder and then coating the particle surfaces with carbon black, the binder on the particle surfaces that cannot be coated entirely with the graphite powder can be coated. Since direct contact between the binder and the binder is avoided, the fluidity of the powder mixture for powder metallurgy can be significantly improved.

The present disclosure is based on these discoveries. We thus provide the following.

1. A powder mixture for powder metallurgy, comprising: a raw material powder; a copper powder; a binder; a graphite powder; and carbon black, wherein the raw material powder contains an iron-based powder in an amount of 90 mass % or more with respect to the raw material powder, an average particle size of the graphite powder is less than 5 μm, a ratio $[m_b/(m_r+m_g+m_{Cu}+m_c)\times100]$ of a mass $m_b$ of the binder to a sum of a mass $m_r$ of the raw material powder, a mass $m_g$ of the graphite powder, a mass $m_{Cu}$ of the copper powder, and a mass $m_c$ of the carbon black is 0.10 mass % to 0.80 mass %, a ratio $[m_g/(m_r+m_g+m_{Cu}+m_c)\times100]$ of the mass $m_g$ of the graphite powder to the sum of the mass $m_r$ of the raw material powder, the mass $m_g$ of the graphite powder, the mass $m_{Cu}$ of the copper powder, and the mass $m_c$ of the carbon black is 0.6 mass % to 1.0 mass %, a ratio $[m_{Cu}/(m_r+m_g+m_{Cu}+m_c)\times100]$ of the mass $m_{Cu}$ of the copper powder to the sum of the mass $m_r$ of the raw material powder, the mass $m_g$ of the graphite powder, the mass $m_{Cu}$ of the copper powder, and the mass $m_c$ of the carbon black is 0.1 mass % to 3.0 mass %, a ratio $[m_c/(m_r+m_g+m_{Cu}+m_c)\times100]$ of the mass $m_c$ of the carbon black to the sum of the mass $m_r$ of the raw material powder, the mass $m_g$ of the graphite powder, the mass $m_{Cu}$ of the copper powder, and the mass $m_c$ of the carbon black is 0.01 mass % to 0.30 mass %, a surface of the raw material powder is coated with at least part of the binder, and a surface of the binder is coated with at least part of the graphite powder, at least part of the copper powder, and at least part of the carbon black.

2. The powder mixture for powder metallurgy according to 1., wherein
the binder is one or more resins selected from the group consisting of copolyamide and polyurethane.

3. The powder mixture for powder metallurgy according to 1. or 2., wherein an average particle size of the copper powder is less than 10 µm.

4. A method for producing a powder mixture for powder metallurgy, the method comprising: mixing a raw material powder, a copper powder, and a binder at a temperature higher than or equal to a melting point of the binder, to obtain a first powder mixture; mixing the first powder mixture and a graphite powder having an average particle size of less than 5 µm at a temperature higher than or equal to the melting point of the binder, to obtain a second powder mixture; and mixing the second powder mixture and carbon black at a temperature lower than or equal to the melting point of the binder, to obtain a powder mixture for powder metallurgy, wherein the raw material powder contains an iron-based powder in an amount of 90 mass % or more with respect to the raw material powder, a ratio $[m_b/(m_r+m_g+m_{Cu}+m_c)\times100]$ of a mass $m_b$ of the binder to a sum of a mass $m_r$ of the raw material powder, a mass $m_g$ of the graphite powder, a mass $m_{Cu}$ of the copper powder, and a mass $m_c$ of the carbon black is 0.10 mass % to 0.80 mass %, a ratio $[m_g/(m_r+m_g+m_{Cu}+m_c)\times100]$ of the mass $m_g$ of the graphite powder to the sum of the mass $m_r$ of the raw material powder, the mass $m_g$ of the graphite powder, the mass $m_{Cu}$ of the copper powder, and the mass $m_c$ of the carbon black is 0.6 mass % to 1.0 mass %, a ratio $[m_{Cu}/(m_r+m_g+m_{Cu}+m_c)\times100]$ of the mass $m_{Cu}$ of the copper powder to the sum of the mass $m_r$ of the raw material powder, the mass $m_g$ of the graphite powder, the mass $m_{Cu}$ of the copper powder, and the mass $m_c$ of the carbon black is 0.1 mass % to 3.0 mass %, and a ratio $[m_c/(m_r+m_g+m_{Cu}+m_c)\times100]$ of the mass $m_c$ of the carbon black to the sum of the mass $m_r$ of the raw material powder, the mass $m_g$ of the graphite powder, the mass $m_{Cu}$ of the copper powder, and the mass $m_c$ of the carbon black is 0.01 mass % to 0.30 mass %.

5. The method for producing a powder mixture for powder metallurgy according to 4., wherein the binder is one or more resins selected from the group consisting of copolyamide and polyurethane.

6. The method for producing a powder mixture for powder metallurgy according to 4. or 5., wherein an average particle size of the copper powder is less than 10 µm.

Advantageous Effect

A powder mixture for powder metallurgy according to the present disclosure has excellent fluidity. Therefore, the powder mixture for powder metallurgy according to the present disclosure can be ejected from a die with little force in forming, and also continuously formed without causing die galling. This increases the yield rate of formed parts, and achieves high productivity. Moreover, segregation of Cu hardly occurs in the powder mixture for powder metallurgy according to the present disclosure, so that a sintered body with high dimensional accuracy can be obtained. A production method according to the present disclosure can produce the powder mixture for powder metallurgy without using a solvent.

DETAILED DESCRIPTION

The presently disclosed techniques will be described in detail below.

A powder mixture for powder metallurgy according to the present disclosure contains a raw material powder, a copper powder, a binder, a graphite powder, and carbon black as essential components. Each of the components will be described below.

[Raw Material Powder]

As the raw material powder, a powder containing an iron-based powder is used. The ratio of the iron-based powder in the raw material powder is 90 mass % or more, and is more preferably 95 mass % or more. No upper limit is placed on the ratio of the iron-based powder in the raw material powder, and the ratio may be 100 mass %. That is, the raw material powder may consist of only the iron-based powder. From the viewpoint of imparting various properties to a sintered body finally obtained, however, a mixed powder consisting of the iron-based powder and the below-described auxiliary raw material is preferably used as the raw material powder.

[Iron-Based Powder]

The iron-based powder is not limited, and any iron-based powder may be used. Examples of the iron-based powder include an iron powder and an alloyed steel powder. As the alloyed steel powder, for example, one or more selected from the group consisting of a pre-alloyed steel powder (fully alloyed steel powder) obtained by alloying an alloying element beforehand in steelmaking, a partially diffusion-alloyed steel powder obtained by partially diffusing and alloying an alloying element in an iron powder, and a hybrid steel powder obtained by partially diffusing an alloying element in a pre-alloyed steel powder. Herein, the term "iron-based powder" denotes a metal powder having a Fe content of 50 mass % or more. The term "iron powder" denotes a powder consisting of Fe and inevitable impurities, and is commonly referred to as "pure iron powder" in this technical field.

A method for producing the iron-based powder is not limited, and an iron-based powder produced by any method may be used. Examples of iron-based powders suitable for use include an atomized iron-based powder produced by atomization and a reduced iron-based powder produced by reduction.

The average particle size of the iron-based powder is not limited, but is preferably 70 µm to 100 µm. The particle size of the iron-based powder is measured by dry sieving in accordance with JIS Z 2510: 2004, unless stated otherwise.

[Auxiliary Raw Material]

The auxiliary raw material is not limited, and any auxiliary raw material may be used. As the auxiliary raw material, one or more selected from the group consisting of an alloying powder and a machinability improvement powder are preferably used. As the alloying powder, a metal powder is preferably used. As the metal powder, for example, one or more selected from the group consisting of metal powders such as a Ni powder and a Mo powder are preferably used. The machinability improvement powder is, for example, MnS. The ratio of the auxiliary raw material in the raw material powder is 10 mass % or less.

[Binder]

The surface of the raw material powder is coated with at least part of the binder. Any binder that can cause the graphite powder, the copper powder, and the carbon black to adhere to the surface of the raw material powder can be used. As the binder, an organic resin is preferably used, and one or more resins selected from the group consisting of copolyamide and polyurethane are more preferably used.

Additive amount of binder: 0.10 mass % to 0.80 mass %

If the additive amount of the binder is less than 0.10 mass %, the surface of the raw material powder cannot be sufficiently coated with the binder. The additive amount of the binder is therefore 0.10 mass % or more. If the additive amount of the binder is more than 0.80 mass %, the surface of the graphite powder is also coated with the binder, and as a result the fluidity decreases. The additive amount of the binder is therefore 0.80 mass % or less. Herein, the additive amount of the binder is defined as the ratio $[m_b/(m_r+m_g+m_{Cu}+m_c)\times100]$ of the mass $(m_b)$ of the binder to the sum of the mass $(m_r)$ of the raw material powder, the mass $(m_g)$ of the graphite powder, the mass $(m_{Cu})$ of the copper powder, and the mass $(m_c)$ of the carbon black.

The binder is preferably in powder form. If the average particle size of the binder is less than 5 μm, the cost for grinding to the particle size increases, and the raw material cost increases. Accordingly, the average particle size of the binder is preferably 5 μm or more, from the viewpoint of cost reduction. If the average particle size of the binder is more than 100 μm, the time required to uniformly mix the binder with the raw material powder increases, and the productivity decreases. Accordingly, the average particle size of the binder is preferably 100 μm or less, from the viewpoint of productivity improvement.

If the melting point of the binder is lower than 60° C., the fluidity of the powder mixture decreases, for example, in summer when air temperature is high. Accordingly, the melting point of the binder is preferably 60° C. or higher, from the viewpoint of reducing the influence of air temperature. If the melting point of the binder is higher than 160° C., the time and energy required for heating to the melting point of the binder or higher increases, and the productivity decreases. Accordingly, the melting point of the binder is preferably 160° C. or lower, from the viewpoint of productivity improvement.

[Graphite Powder]

The surface of the binder that coats the surface of the raw material powder is coated with at least part of the graphite powder. In other words, the surface of the raw material powder is coated with the graphite powder, with the binder being interposed therebetween. As a result of the surface of the iron-based powder being coated with the graphite powder with the binder being interposed therebetween, the lubricity of the surface of the iron-based powder is improved. Moreover, as a result of the graphite powder being interposed therebetween, direct contact between the iron-based powder and a die is avoided. Since the iron-based powder is kept from adhering to and accumulating on the die surface, die galling can be prevented.

Average particle size of graphite powder: less than 5 μm

Graphite powders typically used in powder metallurgy are about 5 μm to 20 μm in particle size. However, if the average particle size of the graphite powder is 5 μm or more, the number of particles of the graphite powder is small, which makes it difficult to sufficiently coat the surface of the iron-based powder with the graphite powder. In the present disclosure, to sufficiently coat the surface of the raw material powder containing the iron-based powder with the graphite powder, the average particle size of the graphite powder is less than 5 μm. Given that a smaller average particle size of the graphite powder is better, no lower limit is placed on the average particle size of the graphite powder. If the particle size is excessively small, however, energy required for grinding increases, which is economically disadvantageous. Accordingly, the average particle size of the graphite powder is preferably 100 nm or more, from an economic viewpoint.

Additive amount of graphite powder: 0.6 mass % to 1.0 mass %

If the additive amount of graphite is less than 0.6 mass %, the outermost surface of the iron-based powder cannot be sufficiently coated with the graphite powder. To achieve a sufficient effect of coating with the graphite powder, the additive amount of the graphite powder needs to be 0.6 mass % or more. The graphite powder is eventually consumed for carburizing in sintering, and enhances the properties of the sintered body such as strength. If the additive amount of the graphite powder is more than 1.0 mass %, however, the properties of the sintered body decrease. The additive amount of the graphite powder is therefore 1.0 mass % or less. Herein, the additive amount of the graphite powder is defined as the ratio $[m_g/(m_r+m_g+m_{Cu}+m_c)\times100]$ of the mass $(m_g)$ of the graphite powder to the sum of the mass $(m_r)$ of the raw material powder, the mass $(m_g)$ of the graphite powder, the mass $(m_{Cu})$ of the copper powder, and the mass $(m_c)$ of the carbon black.

[Copper Powder]

The surface of the binder that coats the surface of the raw material powder is further coated with at least part of the copper powder. In other words, the surface of the raw material powder is coated with the copper powder, with the binder being interposed therebetween. The addition of the copper powder improves the mechanical properties of the sintered body.

Moreover, as a result of the copper powder adhering to the binder surface, segregation of the copper powder during transportation, filling, or forming is suppressed, with it being possible to stabilize the dimensional accuracy after sintering.

Additive amount of copper powder: 0.1 mass % to 3.0 mass %

To achieve the effect of adding the copper powder, the additive amount of the copper powder is 0.1 mass % or more. If the additive amount of the copper powder is more than 3.0 mass %, Cu growth increases, causing unstable dimensional accuracy. In addition, a density decrease due to Cu growth causes decreases in the strength and toughness of the sintered body. The additive amount of the copper powder is therefore 3.0 mass % or less. Herein, the additive amount of the copper powder is defined as the ratio $[m_{Cu}/(m_r+m_g+m_{Cu}+m_c)\times100]$ of the mass $(m_{Cu})$ of the copper powder to the sum of the mass $(m_r)$ of the raw material powder, the mass $(m_g)$ of the graphite powder, the mass $(m_{Cu})$ of the copper powder, and the mass $(m_c)$ of the carbon black.

As the copper powder, a copper powder of any particle size may be used. However, a copper powder of 50 μm or less in average particle size adheres to the surface of the iron-based powder more easily than a copper powder of more than 50 μm in average particle size. Hence, the average particle size of the copper powder is preferably 50 μm or less, and more preferably less than 10 μm.

[Carbon Black]

The surface of the binder that coats the surface of the raw material powder is coated with at least part of the carbon black. In other words, the surface of the raw material powder is coated with the carbon black, with the binder being interposed therebetween. As a result of the surface of the iron-based powder being coated with the graphite powder and further coated with the carbon black, the binder exposed at the surface of the iron-based powder is further reduced. Since direct contact between the binder and the binder is avoided, the fluidity is improved. The carbon black is not limited, and any carbon black may be used.

The specific surface area of the carbon black is not limited, but is preferably 50 m 2/g or more. The carbon black whose specific surface area is 50 m 2/g or more has a small particle size, so that the additive amount of the carbon black necessary for coating the binder surface can be reduced. Consequently, the compressibility of the powder mixture can be further improved. The specific surface area is preferably 100 m 2/g or less. If the specific surface area is 100 m 2/g or less, a decrease in mechanical properties cause by dimensional variation in sintering can be further suppressed. In the present disclosure, the specific surface area of the carbon black can be measured by a BET method (JIS K 6217-2: 2001).

The average particle size of the carbon black is not limited. If the average particle size of the carbon black is less than 5 nm, however, the carbon black is likely to be buried in irregularities of the surface of the iron-based powder or in the binder present on the surface of the iron-based powder. Moreover, if the average particle size of the carbon black is less than 5 nm, the carbon black may adhere to the binder surface in an aggregated state. Accordingly, the average particle size of the carbon black is preferably 5 nm or more, from the viewpoint of further enhancing the effect of the carbon black. If the average particle size of the carbon black is more than 500 nm, the number of particles of the carbon black decreases, and consequently, the effect of the adhesion of the carbon black decreases. Accordingly, the average particle size of the carbon black is preferably 500 nm or less, from the viewpoint of further enhancing the effect of the carbon black. Herein, the average particle size of the carbon black is an arithmetic mean diameter determined as a result of observing the carbon black particles using an electron microscope.

Additive amount of carbon black: 0.01 mass % to 0.30 mass %

If the additive amount of the carbon black is excessively small, the coverage on the binder surface by the carbon black is insufficient, and the effect of fluidity improvement cannot be achieved. If the additive amount is excessively large, the ejection force in the forming may increase.

Accordingly, the additive amount of the carbon black is 0.01 mass % to 0.30 mass %. Herein, the additive amount of the carbon black is defined as the ratio $[m_c/(m_r+m_g+m_{Cu}+m_c)\times100]$ of the mass ($m_c$) of the carbon black to the sum of the mass ($m_r$) of the raw material powder, the mass ($m_g$) of the graphite powder, the mass ($m_{Cu}$) of the copper powder, and the mass ($m_c$) of the carbon black.

[Production Method]

A method for producing the powder mixture for powder metallurgy will be described below. A production method according to one of the disclosed embodiments includes a first mixing process, a second mixing process, and a third mixing process. In the first mixing process, the raw material powder, the copper powder, and the binder are mixed at a temperature higher than or equal to the melting point of the binder, to obtain a first powder mixture. In the second mixing process, the first powder mixture and the graphite powder having an average particle size of less than 5 μm are mixed at a temperature higher than or equal to the melting point of the binder, to obtain a second powder mixture. In the third mixing process, the second powder mixture and the carbon black are mixed at a temperature lower than or equal to the melting point of the binder, to obtain a powder mixture for powder metallurgy.

If the binder and the graphite powder are premixed, the viscosity of the binder increases, which makes it difficult to uniformly coat the surface of the iron-based powder with the binder. Accordingly, prior to a process of coating with the graphite powder, a process of coating the surfaces of the iron-based powder and the copper powder with the binder is performed.

Thus, the copper powder adheres to the surface of the iron-based powder with the binder being interposed therebetween. From this viewpoint, it is preferable that, in the first mixing process, only the binder is added to and mixed with the raw material powder and the copper powder. Moreover, it is preferable that, in the second mixing process, only the graphite powder is added to and mixed with the raw material powder to which the copper powder adheres by the binder, without further adding the binder.

If the surface of the iron-based powder is simultaneously coated with the binder and the graphite powder, the surface of the graphite powder is also coated with the binder. In such a case, the effect of the coating with the graphite powder is insufficient. By performing the coating with the graphite powder after the coating with the binder, the surface of the graphite powder can be prevented from being coated with the binder. In other words, in the powder mixture for powder metallurgy obtained by the method according to the present disclosure, the surface of the iron-based powder is uniformly coated with the graphite powder that adheres to the iron-based powder with the binder being interposed therebetween. Since the graphite powder is exposed at the outermost surface, the powder mixture for powder metallurgy according to the present disclosure has excellent fluidity and excellent ejectability in die forming.

The binder is partly exposed at the particle surfaces of the iron-based powder after the second mixing process. Hence, the carbon black is mixed in the third mixing process. The carbon black covers the binder surface that cannot be sufficiently coated with the graphite, so that the fluidity can be improved.

A mixing means used in the first mixing process, the second mixing process, and the third mixing process is not limited, and any mixer may be used. From the viewpoint of ease of heating, a high-speed bottom stirring mixer, an inclined rotating pan-type mixer, a rotating hoe-type mixer, or a conical planetary screw-type mixer is preferably used.

The mixing temperature in each of the first mixing process and the second mixing process is higher than or equal to the melting point ($T_m$) of the binder used. In the case where a plurality of binders that differ in melting point are used, the highest melting point of the melting points of the plurality of binders used is taken to be $T_m$. The mixing temperature is preferably higher than or equal to $T_m$ +20° C., and more preferably higher than or equal to $T_m$ +50° C. No upper limit is placed on the mixing temperature. However, given that an excessively high mixing temperature has adverse effects such as a decrease in production efficiency and oxidation of the iron-based powder, the mixing temperature is preferably lower than or equal to $T_m$ +100° C.

The mixing temperature in the third mixing process is lower than or equal to the melting point ($T_m$) of the binder used. In the case where a plurality of binders that differ in melting point are used, the lowest melting point of the melting points of the plurality of binders used is taken to be T m. The mixing temperature is preferably lower than or equal to $T_m-20°$ C., and more preferably lower than or equal to $T_m-50°$ C. No lower limit is placed on the mixing temperature. However, given that an excessively low mixing temperature causes a decrease in production efficiency, the mixing temperature in the third mixing process is preferably 60° C. or higher.

The powder mixture obtained in the above-described manner can be used in production of a sintered body by powder metallurgy. A method for producing the sintered body is not limited, and any method may be used to produce the sintered body. Typically, the powder mixture for powder metallurgy is charged into a die, subjected to compression forming, optionally subjected to sizing, and then sintered. Although the compression forming is usually performed in a temperature range from room temperature to 180° C., particularly in the case where the density of the green compact needs to be increased, warm forming that involves preheating the powder and the die together and then forming the powder may be used. The obtained sintered body is optionally further subjected to heat treatments such as carburizing-quenching, bright quenching, and induction hardening, to yield a product (e.g., a machine part).

In the powder mixture for powder metallurgy according to the present disclosure, one or both of an additional auxiliary raw material and a lubricant may be optionally added after the third mixing process. The additional auxiliary raw material may be the same as the foregoing auxiliary raw material contained in the raw material powder. In the case of adding the lubricant after the third mixing process, as the lubricant, a lubricant other than organic resin is preferably used, and one or more lubricants selected from the group consisting of fatty acid, fatty acid amide, fatty acid bisamide, and metal soap are more preferably used.

EXAMPLES

The structure and effects according to the present disclosure will be described in more detail below, by way of examples. The present disclosure is, however, not limited to the following examples.

A powder mixture for powder metallurgy was produced according to the following procedure. First, a raw material powder, a copper powder, and a binder were heated to a specific mixing temperature while being mixed in a high-speed bottom stirring mixer, to obtain a first powder mixture (first mixing process). As the raw material powder, a pure iron powder (atomized iron powder JIP301A produced by JFE Steel Corporation) as an iron-based powder was used. The type of the binder used, the additive amount of each component, and the mixing temperature are shown in Table 1.

Following this, graphite powder was further added into the high-speed bottom stirring mixer, and mixed in a state of being heated to the mixing temperature, to obtain a second powder mixture (second mixing process). That is, the mixing temperature shown in Table 1 is the mixing temperature in the first mixing process and the second mixing process. As the graphite powder, a commercial graphite powder having the average particle size shown in Table 1 was used.

After the second powder mixture was cooled to a temperature lower than or equal to the melting point in the high-speed bottom stirring mixer, carbon black was further added into the high-speed bottom stirring mixer, and mixed at the temperature (third mixing process). After the mixing ended, the resultant powder mixture for powder metallurgy was discharged from the mixer. As the carbon black, a commercial carbon black having an average particle size of 25 nm was used.

For comparison, in some of Comparative Examples, a graphite powder having an average particle size of 4 μm was added in the first mixing process, instead of adding a graphite powder in the second mixing process. In some of Comparative Examples (No. 18), mixing was performed at room temperature without heating in the first mixing process and the second mixing process. In No. 18, as a result of mixing being performed without heating, the surface of the raw material powder was not coated with the binder and the graphite powder.

For each obtained mixed powder for powder metallurgy, the degree of fluidity and the degree of Cu adhesion were measured and pressing of a green compact was performed according to the following procedures.

(Degree of Fluidity)

50 g of the obtained powder mixture for powder metallurgy was charged into a vessel with an orifice diameter of 2.5 mm, and the time from charging to discharging was measured to determine the degree of fluidity (unit: s/50 g). The other measurement conditions were in accordance with JIS Z 2502: 2012. The degree of fluidity is an index indicating the fluidity of the mixed powder in die filling. A smaller value of the degree of fluidity indicates better fluidity of the mixed powder. In some of Comparative Examples, the powder mixture for powder metallurgy did not flow, and was not discharged from the orifice.

(Degree of Cu Adhesion)

The degree of Cu adhesion defined by the following formula (1) was measured:

$$\text{degree of Cu adhesion [\%]}=A/B\times 100 \quad (1)$$

where A is the Cu content (mass %) in the powder mixture for powder metallurgy sieved to 75 μm or more and 150 μm or less, and B is the Cu content (mass %) in the powder mixture for powder metallurgy.

After the obtained mixture for powder metallurgy was dissolved by a method conforming to JIS G1258: ICP Decomposition with phosphoric and sulfuric acids, the values of A and B were measured using an ICP emission spectrometer (ICPS-8100 produced by Shimadzu Corporation). The measurement was conducted under the conditions of an integral time of 10 sec, and an average value of three measurements was used.

The value of A can be regarded as the amount of Cu adhering to the raw material powder. Hence, the degree of Cu adhesion represents the proportion of Cu adhering to the raw material powder in all Cu contained in the mixture for powder metallurgy. The degree of Cu adhesion can be used as an index of Cu segregation. A larger value of the degree of Cu adhesion indicates better Cu segregation prevention of the powder mixture.

(Pressing)

In pressing, the powder mixture for powder metallurgy was pressed using a die, to obtain a green compact with a diameter of 11.3 mm and a height of 11 mm. The forming pressure in the pressing was 686 MPa. The force (ejection force) necessary to eject the green compact from the die and the compressed density (average of green compact) of the obtained green compact were measured. In some of Comparative Examples, die galling occurred and the green compact could not be ejected from the die.

The measurement results are shown in Table 2. In the case where the powder mixture for powder metallurgy did not flow and was not discharged from the orifice in the measurement of the degree of fluidity, the field "degree of fluidity" indicates "not flowing". In the case where the green compact could not be ejected from the die due to die galling, the fields "compressed density" and "ejection force" indicate "unable to be ejected".

As can be understood from the results in Table 2, each powder mixture for powder metallurgy satisfying the conditions according to the present disclosure had excellent fluidity, was able to be ejected from the green compacting die with little force, and suppressed die galling in the forming. In addition, the degree of Cu adhesion was good.

| | Raw material powder Iron-based powder Type | Copper powder Additive amount *1 (mass %) | Copper powder Average particle size (μm) | Graphite powder Additive amount *2 (mass %) | First mixing process Binder Type | Binder Melting point (°C) | Binder Additive amount *3 (mass %) | Second mixing process Graphite powder Additive amount *2 (mass %) | Second mixing process Graphite powder Average particle size (μm) | Mixing temperature (°C) | Third mixing process Carbon black Additive amount *4 (mass %) | Remarks |
|---|---|---|---|---|---|---|---|---|---|---|---|---|
| 1 | 301A | 2.0 | 28 | 0.8 | Copolyamide | 116 | 0.4 | — | — | 170 | 0.1 | Comparative Example |
| 2 | 301A | 2.0 | 28 | — | Copolyamide | 116 | 0.4 | 0.8 | 4 | 170 | 0.1 | Example |
| 3 | 301A | 2.0 | 28 | 0.8 | Copolyamide | 116 | 0.6 | — | — | 170 | 0.1 | Comparative Example |
| 4 | 301A | 2.0 | 28 | — | Copolyamide | 116 | 0.6 | 0.8 | 4 | 170 | 0.1 | Example |
| 5 | 301A | 2.0 | 28 | — | Copolyamide | 116 | 0.6 | 0.8 | 4 | 140 | 0.05 | Example |
| 6 | 301A | 2.0 | 28 | — | Polyurethane | 96 | 0.6 | 0.8 | 4 | 140 | 0.05 | Example |
| 7 | 301A | 2.0 | 28 | — | Polyurethane | 96 | 0.6 | 0.8 | 4 | 140 | 0.1 | Example |
| 8 | 301A | 2.0 | 28 | 0.8 | Polyurethane | 90 | 0.4 | — | — | 140 | 0.1 | Comparative Example |
| 9 | 301A | 2.0 | 28 | — | Polyurethane | 90 | 0.4 | 0.8 | 4 | 140 | 0.1 | Example |
| 10 | 301A | 2.0 | 28 | 0.8 | Polyurethane | 90 | 0.6 | — | — | 140 | | Comparative Example |
| 11 | 301A | 2.0 | 28 | — | Polyurethane | 90 | 0.6 | 0.8 | 4 | 140 | | Comparative Example |
| 12 | 301A | 0.5 | 28 | — | Copolyamide | 116 | 0.3 | 0.6 | 4 | 170 | 0.1 | Example |
| 13 | 301A | 2.0 | 28 | — | Copolyamide | 116 | 0.05 | 0.8 | 4 | 170 | 0.1 | Comparative Example |
| 14 | 301A | 2.0 | 28 | — | Copolyamide | 116 | 1.0 | 0.8 | 4 | 170 | 0.1 | Comparative Example |
| 15 | 301A | 2.0 | 28 | — | Copolyamide | 116 | 0.6 | 0.3 | 4 | 170 | 0.1 | Comparative Example |
| 16 | 301A | 2.0 | 28 | — | Copolyamide | 116 | 0.6 | 1.2 | 4 | 170 | 0.1 | Comparative Example |
| 17 | 301A | 2.0 | 28 | — | Copolyamide | 116 | 0.6 | 0.8 | 17 | 170 | 0.1 | Comparative Example |
| 18 | 301A | 2.0 | 28 | — | Copolyamide | 116 | 0.5 | 0.8 | 4 | Room temperature | 0.1 | Comparative Example |
| 19 | 301A | 2.0 | 28 | 0.8 | Fatty acid amide | 126 | 0.6 | — | — | 140 | — | Comparative Example |
| 20 | 301A | 2.0 | 28 | 0.8 | Fatty acid amide | 126 | 0.6 | — | — | 140 | 0.1 | Comparative Example |
| 21 | 301A | 2.0 | 1.5 | — | Polyurethane | 96 | 0.6 | 0.8 | 4 | 140 | 0.05 | Example |
| 22 | 301A | 2.0 | 5 | — | Polyurethane | 96 | 0.6 | 0.8 | 4 | 140 | 0.05 | Example |
| 23 | 301A | 2.0 | 20 | — | Polyurethane | 96 | 0.6 | 0.8 | 4 | 140 | 0.05 | Example |
| 24 | 301A | 3.0 | 1.5 | — | Polyurethane | 96 | 0.7 | 0.8 | 4 | 140 | 0.08 | Example |
| 25 | 301A | 3.0 | 1.5 | — | Fatty acid amide | 126 | 0.7 | 0.8 | 4 | 140 | 0.08 | Example |

The contents of the components in Table 1 were calculated according to the following formulas:

additive amount of copper powder(*1): mass of copper powder/(mass of iron-based powder+mass of graphite powder+mass of Cu powder+mass of carbon black)×100 (mass %)

additive amount of graphite powder(*2): mass of graphite powder/(mass of iron-based powder+ mass of graphite powder+mass of Cu powder+ mass of carbon black)×100 (mass %)

additive amount of binder(*3): mass of binder/(mass of iron-based powder+mass of graphite powder+mass of Cu powder+mass of carbon black)×100 (mass %)

additive amount of carbon black(*4): mass of carbon black/(mass of iron-based powder+mass of graphite powder+mass of Cu powder+mass of carbon black)×100 (mass %).

TABLE 2

| | Measurement results | | | | |
|---|---|---|---|---|---|
| No. | Degree of fluidity (s/50 g) | Compressed density (g/cm³) | Ejection force (MPa) | Degree of Cu adhesion (%) | Remarks |
| 1 | 27.0 | 7.08 | 16.6 | 71.5 | Comparative Example |
| 2 | 21.9 | 7.13 | 14.2 | 73.5 | Example |
| 3 | 29.8 | 7.03 | 19.3 | 78.5 | Comparative Example |
| 4 | 23.2 | 7.10 | 13.5 | 80.5 | Example |
| 5 | 23.9 | 7.06 | 15.9 | 83.5 | Example |
| 6 | 24.7 | 7.12 | 11.5 | 62.2 | Example |
| 7 | 23.7 | 7.10 | 12.0 | 62.8 | Example |
| 8 | 28.5 | 7.08 | 15.1 | 51.8 | Comparative Example |
| 9 | 24.1 | 7.16 | 12.4 | 49.8 | Example |
| 10 | Not flowing | 7.04 | 16.5 | 66.9 | Comparative Example |
| 11 | Not flowing | 7.11 | 10.9 | 64.9 | Comparative Example |
| 12 | 23.2 | 7.14 | 13.1 | 69.0 | Example |
| 13 | 29.7 | Unable to be ejected | | 60.0 | Comparative Example |

TABLE 2-continued

Measurement results

| No. | Degree of fluidity (s/50 g) | Compressed density (g/cm$^3$) | Ejection force (MPa) | Degree of Cu adhesion (%) | Remarks |
|---|---|---|---|---|---|
| 14 | 29.2 | 6.95 | 18.7 | 85.5 | Comparative Example |
| 15 | 29.8 | Unable to be ejected | | 75.2 | Comparative Example |
| 16 | 25.4 | 7.04 | 11.3 | 72.3 | Comparative Example |
| 17 | 29.5 | Unable to be ejected | | 71.5 | Comparative Example |
| 18 | 23.5 | 6.99 | 18.2 | 15.8 | Comparative Example |
| 19 | 25.5 | 7.14 | 14.5 | 21.1 | Comparative Example |
| 20 | 23.5 | 7.12 | 15.0 | 19.1 | Comparative Example |
| 21 | 24.4 | 7.11 | 12.8 | 110.1 | Example |
| 22 | 24.4 | 7.12 | 13.1 | 92.6 | Example |
| 23 | 26.5 | 7.12 | 15.3 | 80.7 | Example |
| 24 | 24.6 | 7.13 | 13.3 | 98.6 | Example |
| 25 | 25.1 | 7.14 | 11.8 | 85.8 | Example |

The invention claimed is:

1. A powder mixture for powder metallurgy, comprising:
a raw material powder;
a copper powder;
a binder;
a graphite powder; and
carbon black,
wherein the binder is one or more resins selected from the group consisting of copolyamide and polyurethane,
the raw material powder contains an iron-based powder in an amount of 90 mass % or more with respect to the raw material powder,
an average particle size of the graphite powder is less than 5 μm,
a ratio $[m_b/(m_r+m_g+m_{Cu}+m_c)\times 100]$ of a mass $m_b$ of the binder to a sum of a mass $m_r$ of the raw material powder, a mass $m_g$ of the graphite powder, a mass $m_{Cu}$ of the copper powder, and a mass $m_c$ of the carbon black is 0.3 mass % to 0.80 mass %,
a ratio $[m_g/(m_r+m_g+m_{Cu}+m_c)\times 100]$ of the mass $m_g$ of the graphite powder to the sum of the mass $m_r$ of the raw material powder, the mass $m_g$ of the graphite powder, the mass $m_{Cu}$ of the copper powder, and the mass $m_c$ of the carbon black is 0.6 mass % to 1.0 mass %,
a ratio $[m_{Cu}/(m_r+m_g+m_{Cu}+m_c)\times 100]$ of the mass $m_{Cu}$ of the copper powder to the sum of the mass $m_r$ of the raw material powder, the mass $m_g$ of the graphite powder, the mass $m_{Cu}$ of the copper powder, and the mass $m_c$ of the carbon black is 0.1 mass % to 3.0 mass %,
a ratio $[m_c/(m_r+m_g+m_{Cu}+m_c)\times 100]$ of the mass $m_c$ of the carbon black to the sum of the mass $m_r$ of the raw material powder, the mass $m_g$ of the graphite powder, the mass $m_{Cu}$ of the copper powder, and the mass $m_c$ of the carbon black is 0.01 mass % to 0.30 mass %,
a surface of the raw material powder is coated with at least part of the binder, and
a surface of the binder is coated with at least part of the graphite powder, at least part of the copper powder, and at least part of the carbon black.

2. The powder mixture for powder metallurgy according to claim 1, wherein an average particle size of the copper powder is less than 10 μm.

3. A method for producing a powder mixture for powder metallurgy, the method comprising:
mixing a raw material powder, a copper powder, and a binder at a temperature higher than or equal to a melting point of the binder, to obtain a first powder mixture;
mixing the first powder mixture and a graphite powder having an average particle size of less than 5 μm at a temperature higher than or equal to the melting point of the binder, to obtain a second powder mixture; and
mixing the second powder mixture and carbon black at a temperature lower than or equal to the melting point of the binder, to obtain a powder mixture for powder metallurgy,
wherein the binder is one or more resins selected from the group consisting of copolyamide and polyurethane,
the raw material powder contains an iron-based powder in an amount of 90 mass % or more with respect to the raw material powder,
a ratio $[m_b/(m_r+m_g+m_{Cu}+m_c)\times 100]$ of a mass $m_b$ of the binder to a sum of a mass $m_r$ of the raw material powder, a mass $m_g$ of the graphite powder, a mass $m_{Cu}$ of the copper powder, and a mass $m_c$ of the carbon black is 0.3 mass % to 0.80 mass %,
a ratio $[m_g/(m_r+m_g+m_{Cu}+m_c)\times 100]$ of the mass $m_g$ of the graphite powder to the sum of the mass $m_r$ of the raw material powder, the mass $m_g$ of the graphite powder, the mass $m_{Cu}$ of the copper powder, and the mass $m_c$ of the carbon black is 0.6 mass % to 1.0 mass %,
a ratio $[m_{Cu}/(m_r+m_g+m_{Cu}+m_c)\times 100]$ of the mass $m_{Cu}$ of the copper powder to the sum of the mass $m_r$ of the raw material powder, the mass $m_g$ of the graphite powder, the mass $m_{Cu}$ of the copper powder, and the mass $m_c$ of the carbon black is 0.1 mass % to 3.0 mass %,
a ratio $[m_c/(m_r+m_g+m_{Cu}+m_c)\times 100]$ of the mass $m_c$ of the carbon black to the sum of the mass $m_r$ of the raw material powder, the mass $m_g$ of the graphite powder, the mass $m_{Cu}$ of the copper powder, and the mass $m_c$ of the carbon black is 0.01 mass % to 0.30 mass %,
a surface of the raw material powder is coated with at least part of the binder, and
a surface of the binder is coated with at least part of the graphite powder, at least part of the copper powder, and at least part of the carbon black.

4. The method for producing a powder mixture for powder metallurgy according to claim 3, wherein an average particle size of the copper powder is less than 10 μm.

* * * * *